United States Patent
Xu et al.

(10) Patent No.: US 11,836,955 B2
(45) Date of Patent: Dec. 5, 2023

(54) DETECTING UNFAMILIAR SIGNS

(71) Applicant: Waymo LLC, Mountain View, CA (US)

(72) Inventors: Zhinan Xu, San Jose, CA (US); Maya Kabkab, Mountain View, CA (US); Chen Wu, Cupertino, CA (US); Woojong Koh, San Jose, CA (US)

(73) Assignee: Waymo LLC, Mountain View, CA (US)

( * ) Notice: Subject to any disclaimer, the term of this patent is extended or adjusted under 35 U.S.C. 154(b) by 218 days.

(21) Appl. No.: 17/150,228

(22) Filed: Jan. 15, 2021

(65) Prior Publication Data

US 2021/0191419 A1    Jun. 24, 2021

Related U.S. Application Data

(63) Continuation of application No. 16/220,225, filed on Dec. 14, 2018, now Pat. No. 10,928,828.

(51) Int. Cl.
*G06V 10/778* (2022.01)
*G05D 1/02* (2020.01)
(Continued)

(52) U.S. Cl.
CPC ....... *G06V 10/7784* (2022.01); *G05D 1/0088* (2013.01); *G05D 1/0246* (2013.01);
(Continued)

(58) Field of Classification Search
None
See application file for complete search history.

(56) References Cited

U.S. PATENT DOCUMENTS 6,453,056 B2    9/2002    Laumeyer et al.
6,813,545 B2    11/2004   Stromme
(Continued)

FOREIGN PATENT DOCUMENTS

CN    105335708 A    2/2016
CN    106022300 A    10/2016
(Continued)

OTHER PUBLICATIONS

Islam, Kh, et al., Real-Time (Vision-Based) Road Sign Recognition Using an Artificial Neural Network, Department of Artificial Intelligence, Faculty of Computer Science & Information Technology, University of Malaya, Kuala Lumpur 50603, (https://www.mdpi.com/1424-8220/17/4/853)(Dec. 19, 2016)(hereinafter.*
(Continued)

*Primary Examiner* — Jean Paul Cass
(74) *Attorney, Agent, or Firm* — Botos Churchill IP Law

(57) ABSTRACT

Aspects of the disclosure relate to determining a sign type of an unfamiliar sign. The system may include one or more processors. The one or more processors may be configured to receive an image and identify image data corresponding to a traffic sign in the image. The image data corresponding to the traffic sign may be input in a sign type model. The processors may determine that the sign type model was unable to identify a type of the traffic sign and determine one or more attributes of the traffic sign. The one or more attributes of the traffic sign may be compared to known attributes of other traffic signs and based on this comparison, a sign type of the traffic sign may be determined. The vehicle may be controlled in an autonomous driving mode based on the sign type of the traffic sign.

20 Claims, 12 Drawing Sheets

(51) Int. Cl.
  *G06T 7/60*   (2017.01)
  *G05D 1/00*   (2006.01)
  *G06T 7/90*   (2017.01)
  *G06V 20/20*  (2022.01)
  *G06V 20/58*  (2022.01)

(52) U.S. Cl.
  CPC ............... *G06T 7/60* (2013.01); *G06T 7/90* (2017.01); *G06V 20/20* (2022.01); *G06V 20/582* (2022.01); *G06T 2207/30252* (2013.01)

(56) References Cited

U.S. PATENT DOCUMENTS

| | | |
|---|---|---|
| 7,068,844 B1 | 6/2006 | Javidi et al. |
| 7,466,841 B2 | 12/2008 | Bahlmann et al. |
| 8,064,643 B2 | 11/2011 | Stein et al. |
| 8,233,670 B2 | 7/2012 | Moed et al. |
| 8,254,635 B2 | 8/2012 | Stein et al. |
| 8,538,205 B2 | 9/2013 | Navon et al. |
| 8,675,122 B2 | 3/2014 | Kroepfl et al. |
| 8,872,918 B2 | 10/2014 | Krokel |
| 8,983,136 B2 | 3/2015 | Liu et al. |
| 9,056,395 B1 | 6/2015 | Ferguson et al. |
| 9,092,696 B2 | 7/2015 | Zhang |
| 9,191,634 B2 | 11/2015 | Schofield et al. |
| 9,195,914 B2 | 11/2015 | Fairfield et al. |
| 9,199,641 B2 | 12/2015 | Ferguson et al. |
| 9,269,001 B2 | 2/2016 | R et al. |
| 9,311,543 B2 | 4/2016 | Cho et al. |
| 9,418,303 B2 | 8/2016 | Zobel |
| 9,436,879 B2 | 9/2016 | Zobel |
| 9,442,487 B1 | 9/2016 | Ferguson et al. |
| 9,459,515 B2 | 10/2016 | Stein |
| 9,555,803 B2 | 1/2017 | Pawlicki et al. |
| 9,607,513 B1 | 3/2017 | Williams et al. |
| 9,665,100 B2 | 5/2017 | Shashua et al. |
| 9,697,430 B2 | 7/2017 | Kristensen |
| 9,767,370 B1 | 9/2017 | Lo et al. |
| 9,959,595 B2 | 5/2018 | Livyatan et al. |
| 10,071,676 B2 | 9/2018 | Schofield |
| 10,078,788 B2 | 9/2018 | Stein |
| 10,115,028 B2 | 10/2018 | Abhau |
| 10,132,642 B2 | 11/2018 | Yoshitomi et al. |
| 10,225,473 B2 | 3/2019 | Alibay et al. |
| 10,229,508 B2 | 3/2019 | Alibay et al. |
| 10,268,929 B2 | 4/2019 | Alibay et al. |
| 10,303,960 B2 | 5/2019 | Hattori et al. |
| 10,341,442 B2 | 7/2019 | Sim et al. |
| 10,351,135 B2 | 7/2019 | Pawlicki et al. |
| 10,365,658 B2 | 7/2019 | Fridman |
| 10,395,383 B2 | 8/2019 | Alibay et al. |
| 11,127,162 B2* | 9/2021 | Herman ............... G06T 7/75 |
| 11,175,156 B2* | 11/2021 | Herman ............ G06V 20/586 |
| 11,380,110 B1* | 7/2022 | Ben Yaacov .......... G06V 10/82 |
| 2001/0043718 A1 | 11/2001 | Laumeyer et al. |
| 2006/0096780 A1* | 5/2006 | Ru ...................... H05K 1/167 |
| | | 174/250 |
| 2008/0137908 A1* | 6/2008 | Stein .................... G06V 20/582 |
| | | 382/103 |
| 2009/0074249 A1* | 3/2009 | Moed ................... G06V 20/582 |
| | | 382/104 |
| 2009/0285445 A1 | 11/2009 | Vasa |
| 2011/0109476 A1* | 5/2011 | Porikli .................. G06F 18/214 |
| | | 340/905 |
| 2011/0216202 A1 | 9/2011 | Natroshvili et al. |
| 2015/0193663 A1 | 7/2015 | Oh et al. |
| 2015/0251602 A1 | 9/2015 | Baur et al. |
| 2016/0117562 A1 | 4/2016 | Chung |
| 2016/0217336 A1 | 7/2016 | Su et al. |
| 2016/0321511 A1 | 11/2016 | Abhau |
| 2017/0008521 A1 | 1/2017 | Braunstein et al. |
| 2017/0323452 A1 | 11/2017 | Chen et al. |
| 2018/0188060 A1* | 7/2018 | Wheeler ............. G01C 21/3635 |
| 2018/0349716 A1 | 12/2018 | Park et al. |
| 2019/0114493 A1* | 4/2019 | Ewert .................... G06F 18/22 |

FOREIGN PATENT DOCUMENTS

| | | |
|---|---|---|
| CN | 108090459 A | 5/2018 |
| CN | 108509900 A | 9/2018 |
| CN | 108918532 A | 11/2018 |
| JP | 2009217832 A | 9/2009 |
| JP | 2015191624 A | 11/2015 |
| KR | 20150085988 A | 7/2015 |
| WO | 2016002276 A1 | 1/2016 |

OTHER PUBLICATIONS

The Extended European Search Report for European Patent Application No. 19897266.3, dated Jun. 28, 2022.

Min, et al., "A New Approach to Track Multiple Vehicles With the Combination of Robust Detection and Two Classifiers", IEEE Transactions on Intelligent Transportation Systems, vol. 19, No. 1, 2018, pp. 174-186.

Zhang, "Reliable Classification of Vehicle Types Based on Cascade Classifier Ensembles", IEEE Transaction on Intelligent Transporation Systems, vol. 14, No. 1, 2013, pp. 322-332.

Notification of the Decision to Grant and Search Report for Chinese Patent Application No. 201980083061 X, dated Apr. 2, 2022.

Fang, Shengchao et al.. Traffic Sign Detection Based on Co-training Method, Proceedings of the 33rd Chinese Control Conference, Jul. 28-30, 2014, Nanjing, China.

International Search Report and Written Opinion for Application No. PCT/US2019/065189 dated Mar. 30, 2020.

Hao, "Detection of Traffic signs based on multi feature high credibility region", School of Electronic and Information Engineering, Beijing (2015) Advanced Materials and Structural Engineering: Proceedings of the International Conference on Advanced Materials and Engineering Structural Technology (ICAMEST 2015).

Notice of Reasons for Rejection for Japanese Patent Application No. 2021-531096, dated Sep. 1, 2022.

* cited by examiner

DETECTING UNFAMILIAR SIGNS

CROSS REFERENCE FOR RELATED APPLICATIONS

This application is a continuation of U.S. application Ser. No. 16/220,225, filed Dec. 14, 2018, the entire disclosure of which is incorporated herein by reference

BACKGROUND

Autonomous vehicles, such as vehicles which do not require a human driver when operating in an autonomous driving mode, may be used to aid in the transport of passengers or items from one location to another. An important component of an autonomous vehicle is the perception system, which allows the vehicle to perceive and interpret its surroundings using sensors such as cameras, radar, LIDAR sensors, and other similar devices. For instance, the perception system and/or the vehicle's computing devices may process data from these sensors in order to identify objects as well as their characteristics such as location, shape, size, orientation, acceleration or deceleration, velocity, type, etc. This information is important for the vehicle's computing systems to make appropriate driving decisions for the vehicle.

BRIEF SUMMARY

Aspects of the disclosure prove a method for determining a sign type of an unfamiliar sign. The method may include: receiving, by one or more processors, an image generated by a perception system of a vehicle; identifying, by the one or more processors, image data corresponding to a traffic sign in the image; inputting, by the one or more processors, the image data corresponding to the traffic sign into a sign type model; determining, by the one or more processors, that the sign type model was unable to identify a type of the traffic sign; determining, by the one or more processors, one or more attributes of the traffic sign; comparing, by the one or more processors, the one or more attributes of the traffic sign to known attributes of other traffic signs; determining, by the one or more processors, a sign type of the traffic sign based on the comparing the one or more attributes of the traffic sign; and controlling, by the one or more processors, the vehicle in an autonomous driving mode based on the sign type of the traffic sign.

In some instances, the known attributes of other traffic signs may be stored in a one to many data structure.

In some instances, the sign type model being unable to identify a type of the traffic sign includes the model being unable to identify the sign type of the traffic sign to a minimum confidence level.

In some instances, the one or more attributes of the traffic sign are determined using image processing techniques.

In some instances, the attributes may include one or more of sign type, color, shape, reflection coefficient, placement, text, figures, or accessories.

In some instances, the method may further include determining content of the traffic sign by comparing the one or more attributes of the traffic sign to known attributes of other traffic signs. In some examples, the content of the traffic sign may be informative or instructive. In some examples, controlling the vehicle in an autonomous driving mode based on the sign type of the traffic sign may include taking no action based on the sign type of the traffic sign.

In some instances, the sign type of the traffic sign may include one or more of regulatory, warning, guide, services, recreation, construction, or school zone.

In some instances, controlling the vehicle in an autonomous driving mode based on the sign type of the traffic sign may include: determining content of the traffic sign is instructive of an action; and performing the action.

Aspects of the disclosure may provide a system for determining a sign type of an unfamiliar sign. The system may include one or more processors, and the one or more processors may be configured to: receive an image generated by a perception system of a vehicle; identify image data corresponding to a traffic sign in the image; input the image data corresponding to the traffic sign into a sign type model; determine that the sign type model was unable to identify a type of the traffic sign determining one or more attributes of the traffic sign; compare the one or more attributes of the traffic sign to known attributes of other traffic signs; determine a sign type of the traffic sign based on the comparing the one or more attributes of the traffic sign; and control the vehicle in an autonomous driving mode based on the sign type of the traffic sign In some instances, the known attributes of other traffic signs may be stored in a one to many data structure.

In some instances, the known attributes of other traffic signs may be manually labeled by an operator and/or by using image processing techniques.

In some instances, the one or more attributes of the traffic sign may be determined using image processing techniques.

In some instances, the attributes may include one or more of sign type, color, shape, reflection coefficient, placement, text, figures, or accessories.

In some instances, the one or more processors may be further configured to determine content of the traffic sign by comparing the one or more attributes of the traffic sign to known attributes of other traffic signs. In some examples, the content of the traffic sign is informative or instructive. In some examples, controlling the vehicle in an autonomous driving mode based on the sign type of the traffic sign may include taking no action based on the sign type. In some examples, wherein controlling the vehicle in an autonomous driving mode based on the sign type of the traffic sign may include: determining content of the traffic sign is instructive of an action; and performing the action.

In some instances, the system may include the vehicle.

DETAILED DESCRIPTION

Overview

Figure 1:
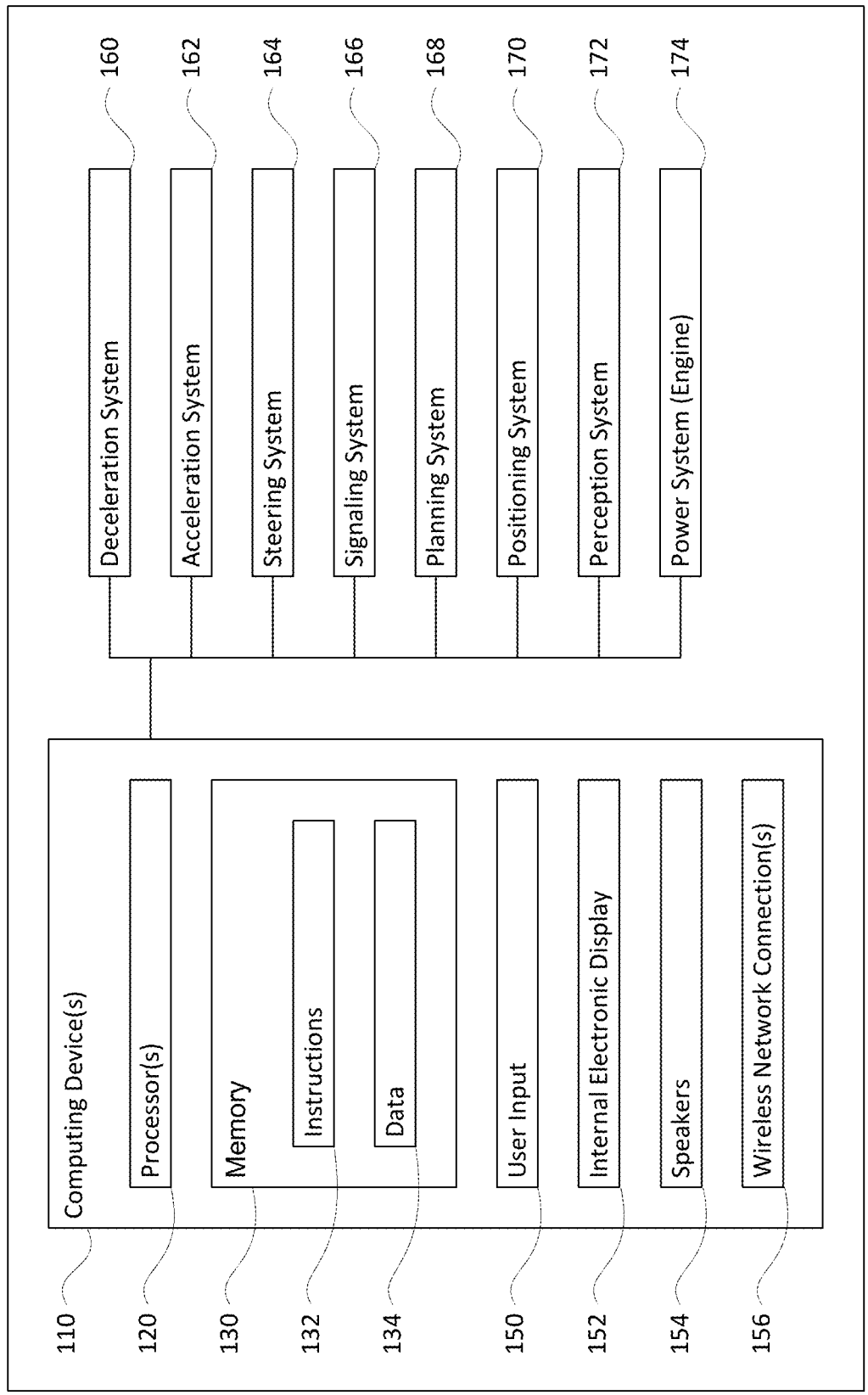
FIG. 1 is a functional diagram of an example vehicle in accordance with an exemplary embodiment.

This technology relates to using characteristics of a traffic sign to determine whether an autonomous vehicle should perform an action. Human drivers regularly encounter and react to traffic signs during a trip. In this regard, a human driver, upon observing a traffic sign, may take a particular action or no actions at all in response to the traffic sign. For instance, a human driver may observe a stop sign and stop the vehicle they are driving. In another example, a human driver may observe a traffic sign for a rest area and take no action at all in response to observing the traffic sign.

Autonomous vehicles, which do not have the same ability to reason about traffic signs as humans, must also determine when and when not to take action in response to traffic signs. In this regard, map information used by an autonomous vehicle may show where particular traffic signs are located. For instance, the location of all stop signs may be found within the map information and autonomous vehicle may stop at those locations. However, traffic signs may be moved, removed, or replaced with different signs, thereby making the map information inaccurate. As such, vehicles may send a request for remote assistance to a human operator in order to receive instructions when no traffic sign is detected or a new sign is detected, thereby leading to travel delays. Moreover, a lot of resources are required to map every traffic sign and assure that such map information is up to date.

To address these issues, an autonomous vehicle may detect traffic signs in real time and determine an appropriate action to take in response to detecting the traffic sign and its content. For instance, one or more sensors on an autonomous vehicle may detect a traffic sign in the vehicle's vicinity. The sensor data corresponding to the traffic sign may be analyzed by one or more computing devices of the autonomous vehicle and characteristics of the traffic sign, such as its type and other attributes, such as color, shape, reflection coefficient, placement, text, figures, accessories, etc., may be determined. In some instances, a machine learning model may be used to assist in determining a sign type. Depending on the traffic sign type, and potentially some of the other attributes of the traffic sign, a determination of the sign's content (e.g., instructive content, informative content, etc.,) may be made. Based on the sign's type and content, a determination as to whether an action should be performed by the vehicle may be made.

The features described herein may allow an autonomous vehicle to detect and respond to traffic signs in real time without requiring those traffic signs to be previously identified, or rather, already stored in the vehicle's map information. This can be especially helpful in unmapped areas or in areas where the map is incorrect or not up to date. Moreover, the features described herein may allow an autonomous vehicle to identify traffic signs which are not identifiable by machine learning models or found within the map information, such as temporary or handmade signs. As such, the autonomous vehicle may be able to determine whether an action should be taken even for unfamiliar signs.

In addition, the detection and identification of a sign's content may assist in the addition of unfamiliar signs to mapping data, particularly if the newly identified sign is of a type typically added to mapping data.

In addition, the features described herein may allow requests for assistance to be prioritized to a human operator when a vehicle detects (i.e., successfully determines,) a sign type but is unable to determine its content. In this regard, when a vehicle encounters an unfamiliar sign which may affect the safe operation of the vehicle, such as regulatory signs, the vehicle's request for assistance may be prioritized to human operators over requests for assistance with unfamiliar signs which do not affect the safe operation of the vehicle, such as recreation signs. In some instances, when a vehicle detects an unfamiliar signs having a certain sign type, no requests for assistance may be made and/or the human operator may disregard such a request.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor.

Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing device 110 may include all of the components normally used in connection with a computing device such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing device 110 to provide information to passengers within the vehicle 100.

Computing device 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

In one example, computing device 110 may be an autonomous driving computing system incorporated into vehicle 100. The autonomous driving computing system may be capable of communicating with various components of the vehicle in order to control the vehicle in an autonomous driving mode. For example, returning to FIG. 1, computing device 110 may be in communication with various systems of vehicle 100, such as deceleration system 160, acceleration system 162, steering system 164, signaling system 166, planner system 168, positioning system 170, and perception system 172 in order to control the movement, speed, etc. of vehicle 100 in accordance with the instructions 134 of memory 130 in the autonomous driving mode. Again, although these systems are shown as external to computing device 110, in actuality, these systems may also be incorporated into computing device 110, again as an autonomous driving computing system for controlling vehicle 100.

As an example, computing device 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. Signaling system 166 may be used by computing device 110 in order to signal the vehicle's intent to other drivers or vehicles, for example, by lighting turn signals or brake lights when needed.

Planning system 168 may be used by computing device 110 in order to determine and follow a route to a location. In this regard, the planning system 168 and/or data 132 may store detailed map information, e.g., highly detailed maps identifying the shape and elevation of roadways, lane lines, intersections, crosswalks, speed limits, traffic signals, buildings, signs, real time traffic information, pull over spots, vegetation, or other such objects and information.

Figure 2:
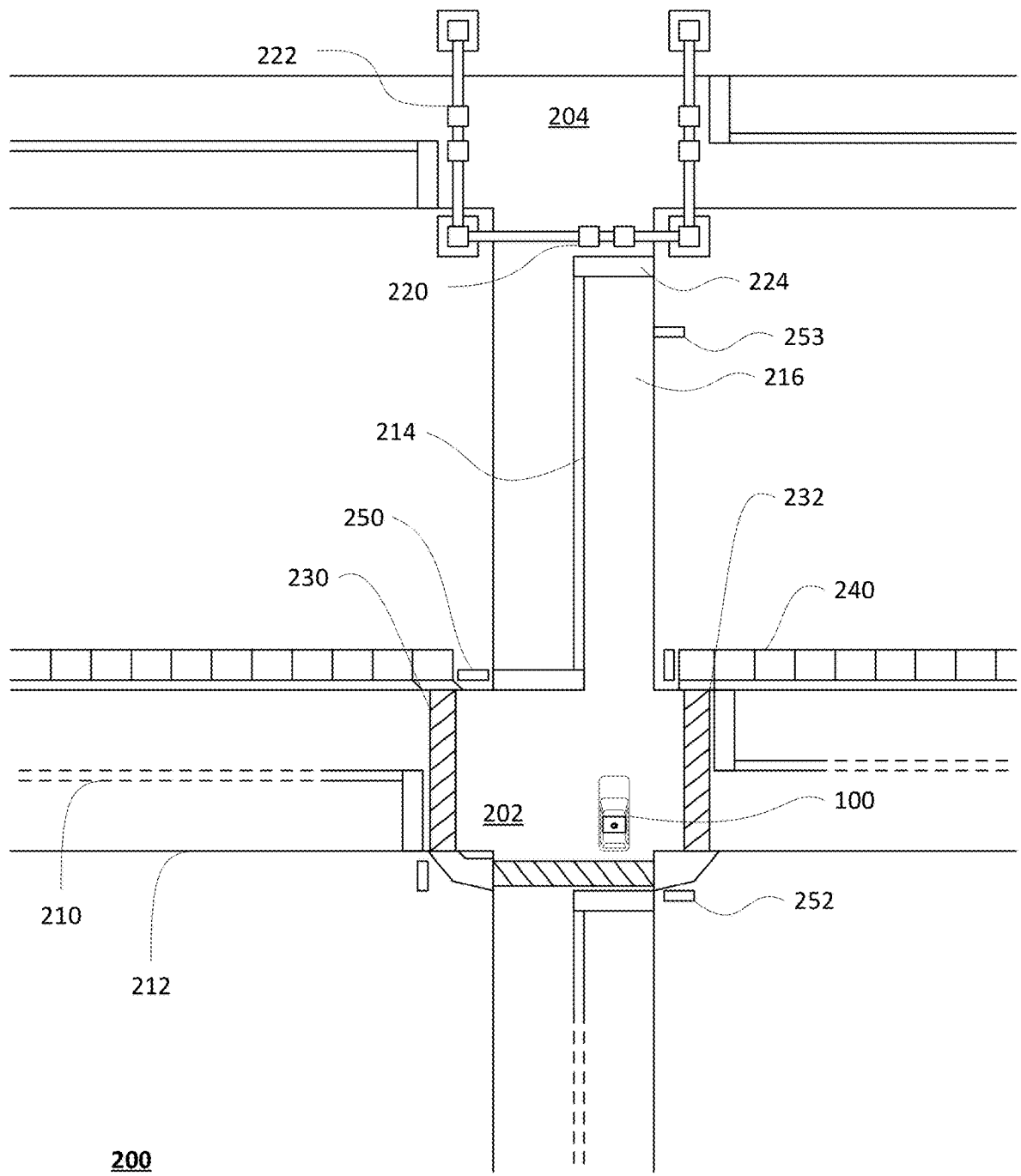
FIG. 2 is an example of map information in accordance with aspects of the disclosure.

FIG. 2 is an example of map information 200 for a section of roadway including intersections 202 and 204. The map information 200 may be a local version of the map information stored in the memory 130 of the computing devices 110. Other versions of the map information may also be stored in the storage system 450 discussed further below. In this example, the map information 200 includes information identifying the shape, location, and other characteristics of lane lines 210, 212, 214, traffic lights 220, 222, stop line 224, crosswalks 230, 232 sidewalks 240, and traffic signs 250, 252. The map information is depicted herein as an image-based map, the map information need not be entirely image based. For example, the map information may include one or more roadgraphs or graph networks of information such as roads, lanes, intersections, and the connections between these features which may be represented by road segments. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

Positioning system 170 may be used by computing device 110 in order to determine the vehicle's relative or absolute position on a map or on the earth. For example, the position system 170 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise that absolute geographical location.

The positioning system 170 may also include other devices in communication with computing device 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Figure 3:
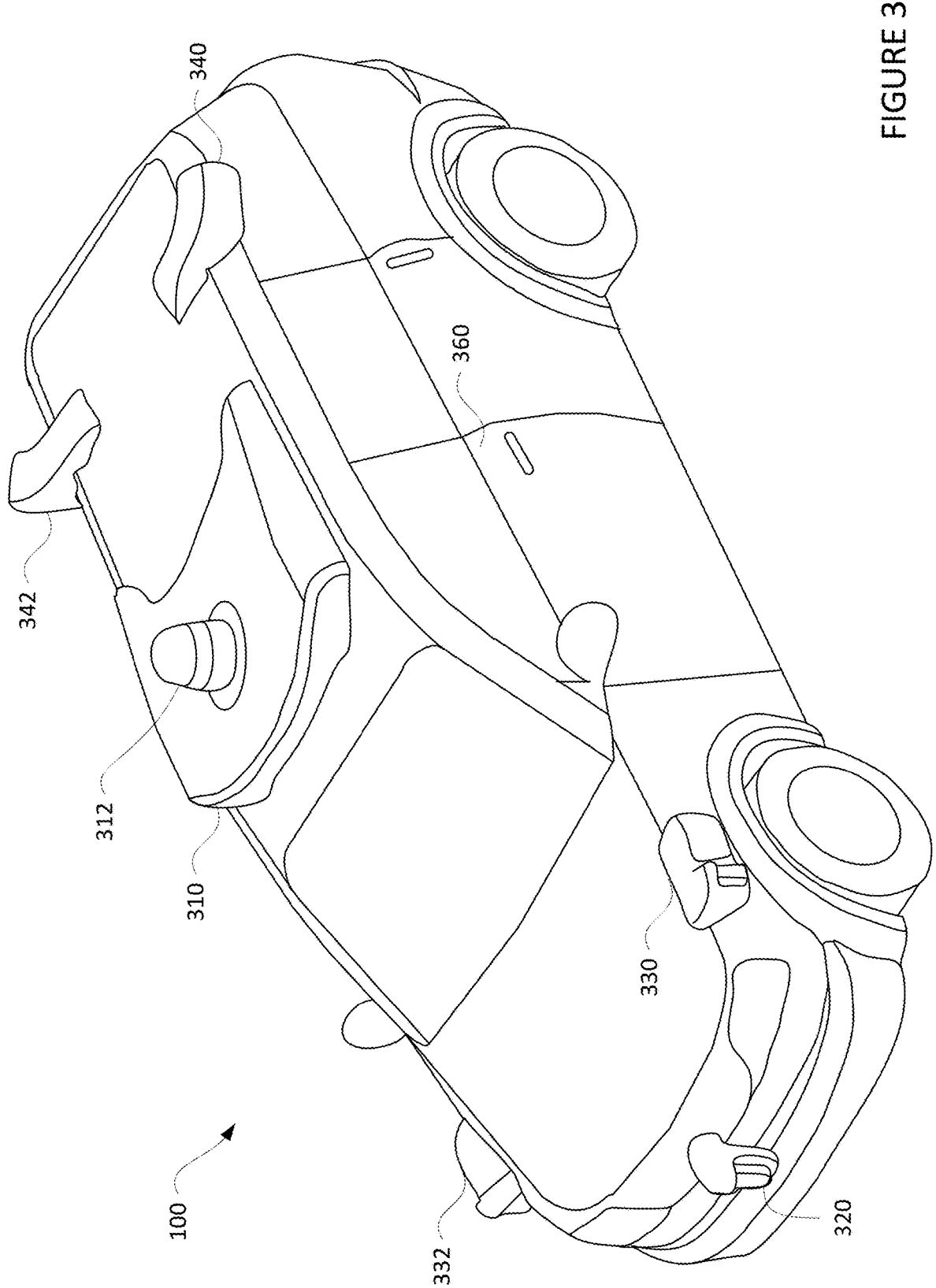
FIG. 3 is an example external view of a vehicle in accordance with aspects of the disclosure.

The perception system 172 also includes one or more components for detecting objects external to the vehicle such as other vehicles, obstacles in the roadway, traffic signals, signs, trees, etc. For example, the perception system 172 may include lasers, sonar, radar, cameras and/or any other detection devices that record data which may be processed by computing device 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

In one example, computing devices 110 may be control computing devices of an autonomous driving computing system or incorporated into vehicle 100. The autonomous driving computing system may be capable of communicating with various components of the vehicle in order to control the movement of vehicle 100 according to primary vehicle control code of memory 130. For example, returning to FIG. 1, computing devices 110 may be in communication with various systems of vehicle 100, such as deceleration system 160, acceleration system 162, steering system 164, signaling system 166, planning system 168, positioning system 170, perception system 172, and power system 174 (i.e. the vehicle's engine or motor) in order to control the movement, speed, etc. of vehicle 100 in accordance with the instructions 134 of memory 130. Again, although these systems are shown as external to computing devices 110, in actuality, these systems may also be incorporated into computing devices 110, again as an autonomous driving computing system for controlling vehicle 100.

The various systems of the vehicle may function using autonomous vehicle control software in order to determine how to control the vehicle and to control the vehicle. As an example, a perception system software module of the perception system 172 may use sensor data generated by one or more sensors of an autonomous vehicle, such as cameras, LIDAR sensors, radar units, sonar units, etc., to detect and identify objects and their characteristics. These characteristics may include location, type, heading, orientation, velocity, acceleration, change in acceleration, size, shape, etc. In some instances, characteristics may be input into a behavior prediction system software module which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may use various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination for the vehicle as well as feedback from various other systems of the vehicle may be input into a planner system software module of the planning system 168. The planning system and/or computing devices 110 may use this input to generate a route and trajectories for the vehicle to follow for some brief period of time into the future. A control system software module of the computing devices 110 may be configured to control movement of the vehicle, for instance by controlling braking, acceleration and steering of the vehicle, in order to follow a trajectory.

The computing device 110 may control the vehicle by controlling various components. For instance, by way of example, computing device 110 may navigate the vehicle to a destination location completely autonomously using data from the detailed map information and planning system 168. Computing device 110 may use the positioning system 170 to determine the vehicle's location and perception system 172 to detect and respond to objects when needed to reach the location safely. Again, in order to do so, computing device 110 may generate trajectories and cause the vehicle to follow these trajectories, for instance, by causing the vehicle to accelerate (e.g., by supplying fuel or other energy to the engine or power system 174 by acceleration system 162), decelerate (e.g., by decreasing the fuel supplied to the engine or power system 174, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing device 110 may also control the drivetrain of the vehicle in order to maneuver the vehicle autonomously.

Figure 4:
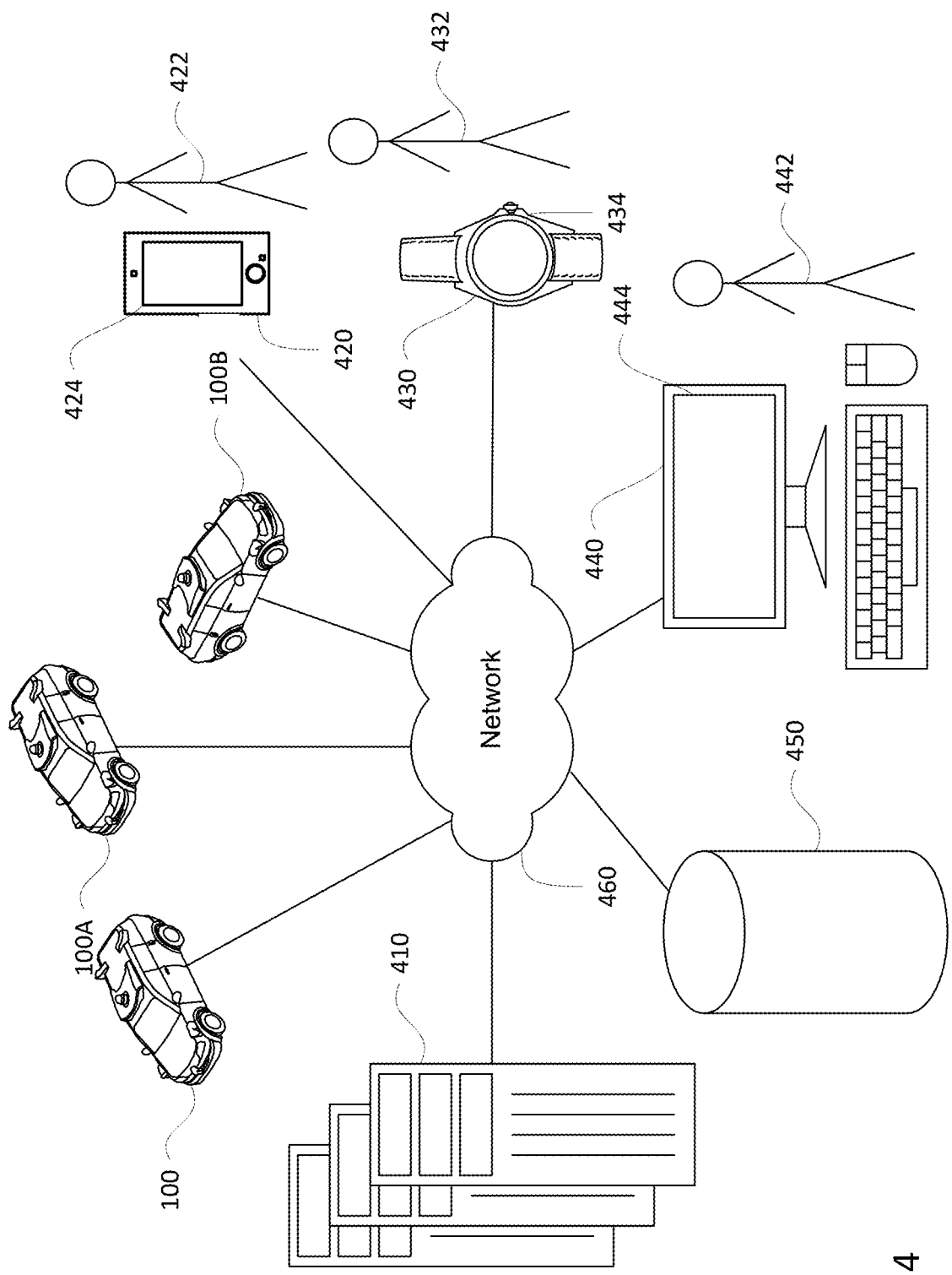
FIG. 4 is a pictorial diagram of an example system in accordance with aspects of the disclosure.
Figure 5:
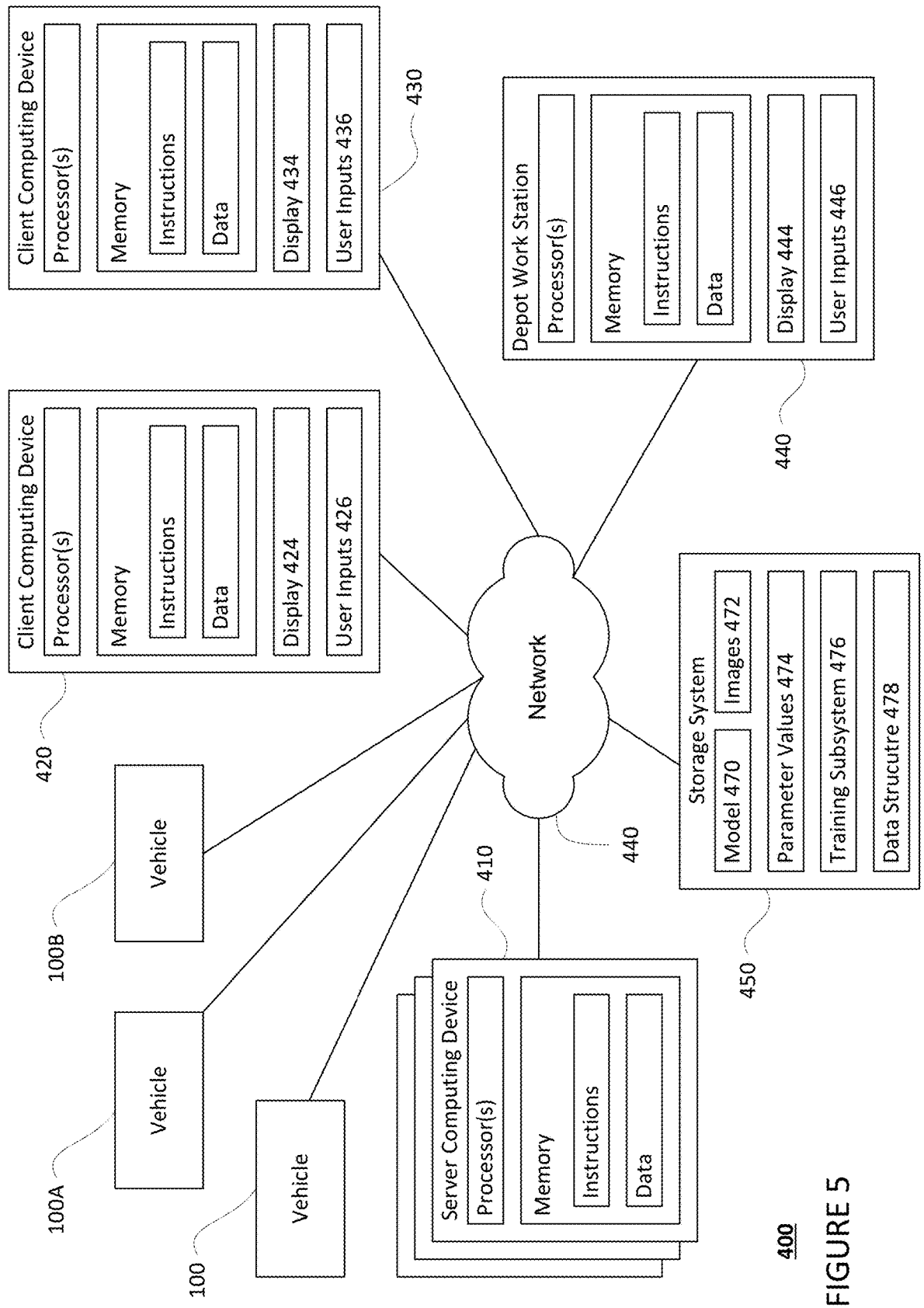
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100, and vehicles 100A, 100B which may be configured the same as or similarly to vehicle 100. Although only a few vehicles and computing devices are depicted for simplicity, a typical system may include significantly more.

As shown in FIG. 4, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 110 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A, 100B as well as computing devices 420, 430, 440 via the network 460. For example, vehicles 100, 100A, 100B may be a part of a fleet of vehicles that can send and receive information from the server computing devices 410. In addition, the server computing devices 410 may use network 460 to transmit and present information to a user, such as one or more of users 422, 432, 442 on a display, such as one or more of displays 424, 434, 444 of computing devices 420, 430, 440. In this regard, computing devices 420, 430, 440 may be considered client computing devices.

As shown in FIG. 4, each client computing device 420, 430, 440 may be a personal computing device intended for use by one or more of users 422, 432, 442, and have all of the components normally used in connection with a personal computing device including one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, microphones, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Storage system 450 may store various types of information as described in more detail below. This information may be retrieved or otherwise accessed by a server computing device, such as one or more server computing devices 410, in order to perform some or all of the features described herein.

For instance, the storage system 450 may store sensor data captured by a vehicle's perception system, such as perception system 172 of vehicle 100. This sensor data may include a plurality of images 472. This plurality of images may include images captured by a perception system of an autonomous vehicle in order to provide the type of sign that may appear in those images. For instance, the plurality of images may be images or frames captured by still and/or video cameras or other sensors mounted on one or more vehicles such as vehicles 100 or 100A and uploaded via network 460 or otherwise sent to the storage system 450 for storage. Thus, the images may accurately reflect perception of the road and various objects from the perspective of the cameras or perception system of the vehicle. At least some of these images may be associated with labels and other information as discussed further below. Storage system 450 may also store traffic sign types and their respective attributes, as discussed herein.

Each image may be associated with location information identifying the location and orientation from which the image was captured and/or more details, such as geographic information for various surfaces within the image as determined from comparing with other images and/or from LIDAR sensor data captured by a LIDAR sensor of the perception system 172 contemporaneously with the image. For instance, the LIDAR sensor data may include data points corresponding to the locations and intensity (or reflectivity) of surfaces off of which light generated by the LIDAR sensor is reflected back to the LIDAR sensor. This information may be used to determine the correspondences of those surfaces in the camera images.

The storage system 450 as well as data 132 of vehicle 100 may store one or more models 470 as well as model parameter values 474 for each such model. For instance, the storage system may store one or more models for determining traffic sign types and context. A model 470 may include a classifier such as an artificial neural network, a deep neural network, decision tree, boosted tree, etc. In addition, the storage system 450 may include a training subsystem 476 that can be used to train a model as discussed further below. In some instances the storage system may store a hierarchical data structure 478 as described herein.

As with memory 130, storage system 450 can be of any type of computer storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIG. 4 and/or may be directly connected to or incorporated into any of the computing devices 110, 410, 420, 430, 440, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

As noted above, a model 470 may take the characteristics of a traffic sign and outputs a traffic sign type. In this regard, traffic sign types may include regulatory, warning, guide, services, recreation, construction, school zone, etc. In some instances, certain signs such as stop signs or railroad crossing signs may be considered sign types.

In order to be able to use the model 470 to identify traffic sign types, the model may first be trained "offline" that is, ahead of time and/or at a remote computing device and thereafter sent to the vehicle 100 via network 460 and wireless network connections 156. For instance, one or more of server computing devices 410 may generate the model parameter values 474 by first retrieving training data from the storage system 450.

Figure 6:
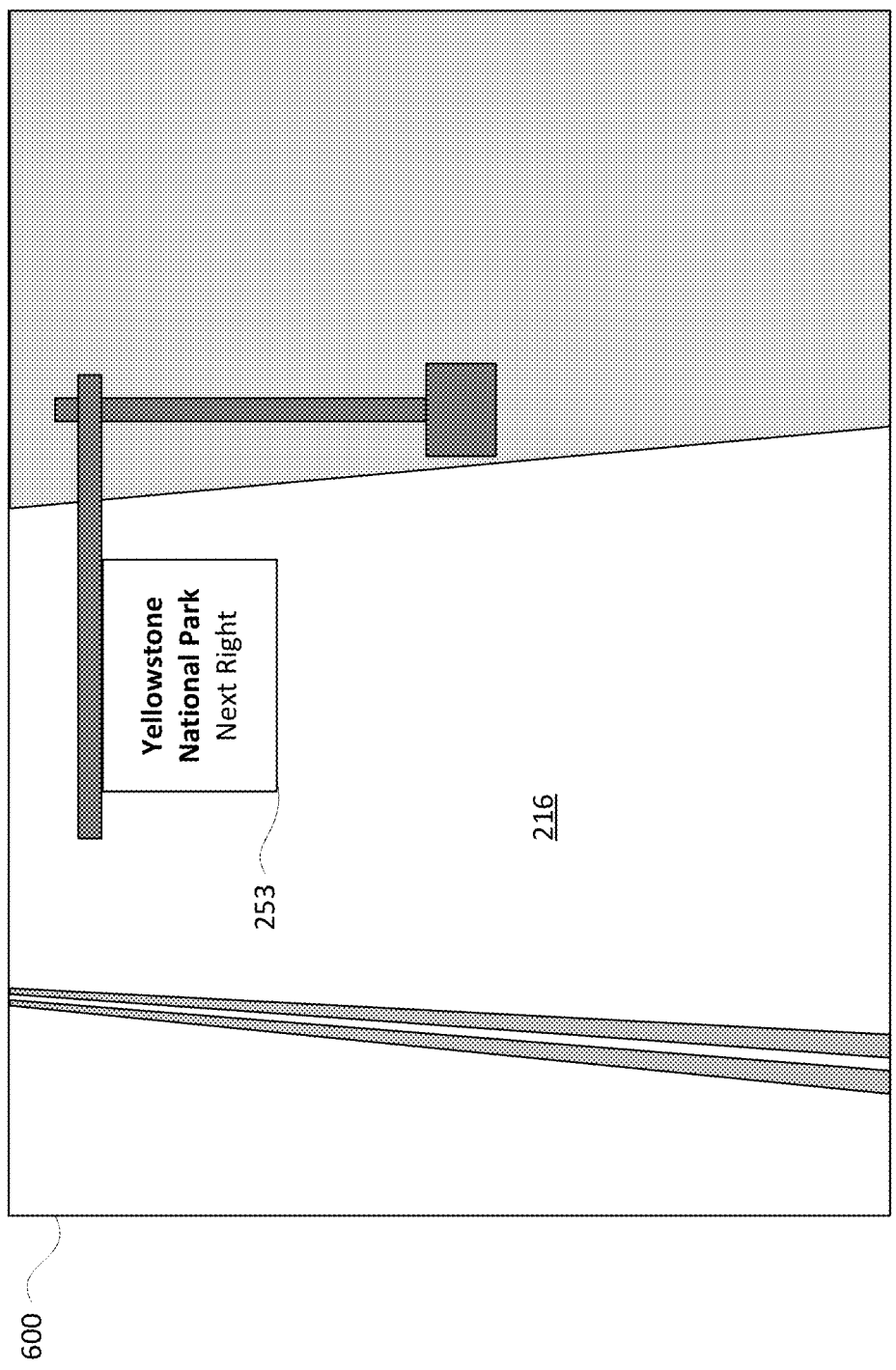
FIG. 6 is an example camera image in accordance with aspects of the disclosure.

For instance, the one or more server computing devices 410 may retrieve a set of images. As noted above, these images may include the plurality of images 472 of storage system 450 corresponding to locations where traffic signs are likely to be visible, such as images that are a predetermined distance from and oriented towards known traffic signs. For instance, images captured by cameras or other sensors mounted on vehicles, such as vehicle 100, where the cameras are within a certain distance of a traffic sign and are oriented towards the traffic sign may be retrieved and/or included in the set. FIG. 6 is an example camera image 600 captured by a camera of perception system 172 of vehicle 100 as the vehicle approaches intersection 204 of the map information. In this example, traffic sign 253 and part of lane 216 are captured in camera image 600. This camera image may be processed and used to generate initial training data for the model. As noted above, the images of the storage system may be associated with information identifying the location and orientation at which the image was captured.

The initial training data for the model 470 may be generated from the set of images in various ways. For instance, human operators may label images of traffic signs as well as the type of traffic sign by reviewing the images, drawing bounding boxes around traffic signs, and identifying the types of traffic signs. In addition or alternatively, existing models or image processing techniques may be used to label images of traffic signs as well as the type of traffic sign.

Figure 7:
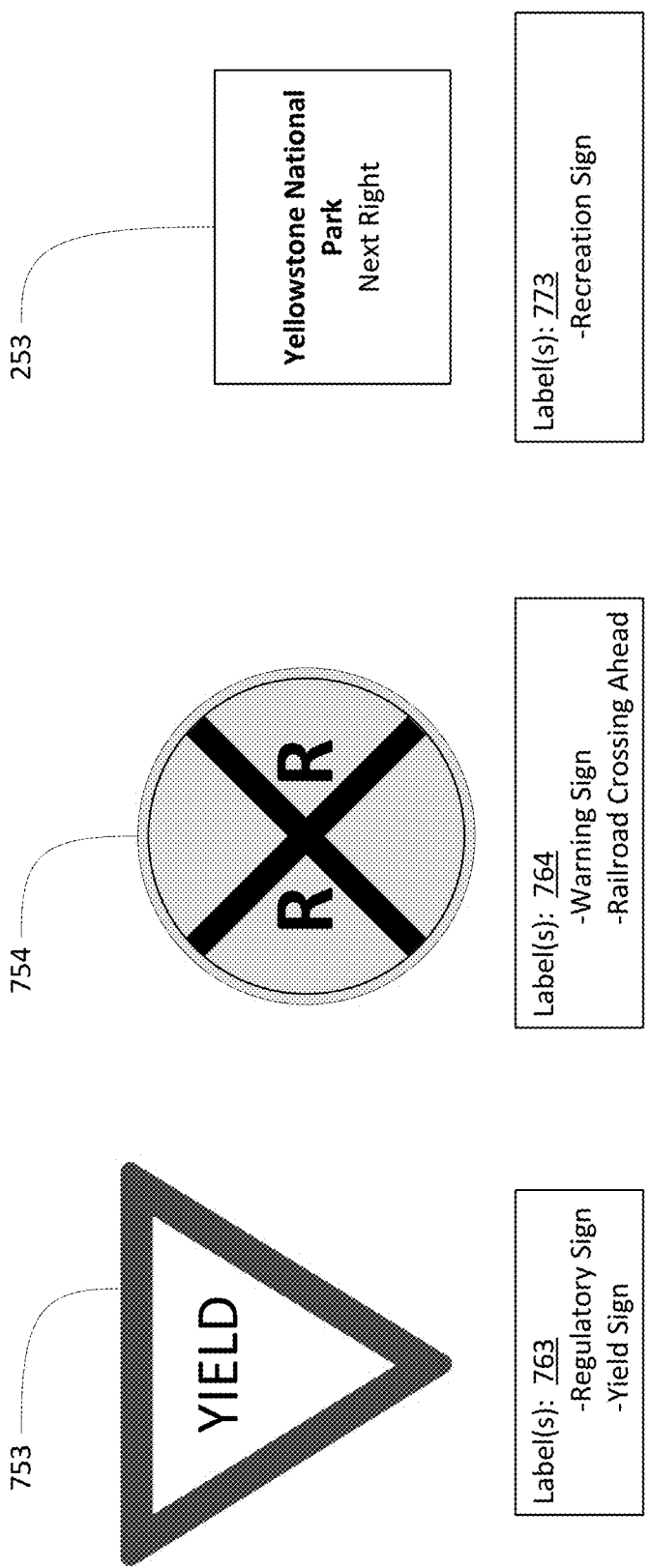
FIG. 7 is example images and corresponding labels in accordance with aspects of the disclosure.

Given an image of a traffic sign, which may be considered a training input, and a label indicating the type of traffic sign, which may be considered a training output, the model may be trained to output the type of traffic sign found in a captured image. In other words, the training input and training output are used to train the model on what input it will be getting and what output it is to generate. As an example, the model may receive images 753, 754, and 253, as shown in FIG. 7. The model may also receive labels 763, 764, and 764 indicating the type of sign each image shows including "regulatory sign", "warning sign", and "recreation sign". In some instances, the type of sign may be specific, such as "yield sign" and "railroad crossing ahead", as further shown in labels 763 and 764 of FIG. 7. Based on this training data, the model may learn to identify similar traffic signs. In this regard, the training may increase the precision of the model such that the more training data (input and output) used to train the model, the greater the precision of the model at identifying sign types.

Figure 8:
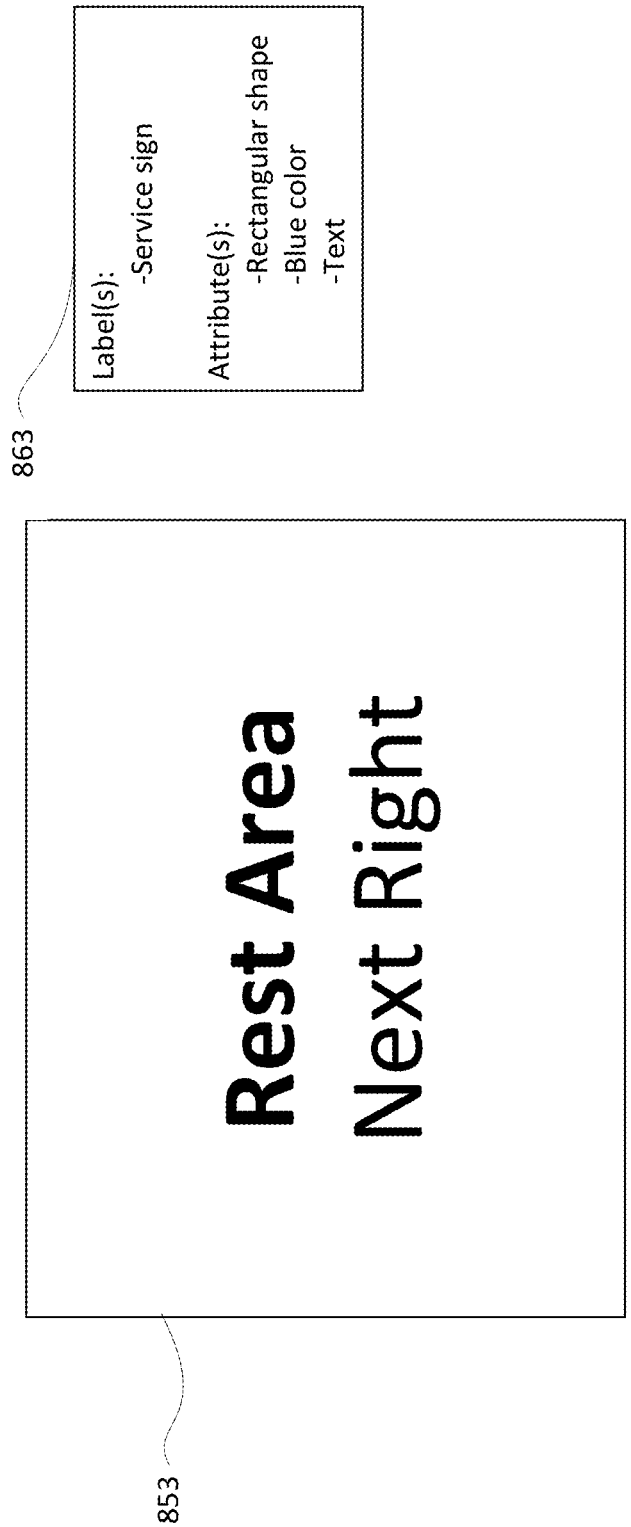
FIG. 8 is an example images and corresponding labels and attributes in accordance with aspects of the disclosure.

In some instances, the model may be configured to provide additional labels indicative of the content of the sign. In this regard, during the training of the machine learning model, the training data may include labels corresponding to the attributes of the traffic signs. For instance, labels 863 indicative of the attributes of a service sign including "rectangular shape," "blue color," and "text" stating "rest area next right", as illustrated in FIG. 8, may be input into the machine learning model along with a label indicating the sign type as a service sign. As such, when the training model is run on an image of the service sign 853 and the label 863, the model may learn that that the sign 853 is a service sign indicating a rest area ahead. Based on this determination, the model may learn that other signs which include attributes such as a "rectangular shape," "blue color," and "text" stating "rest area next right" may also be service signs.

Figure 9:
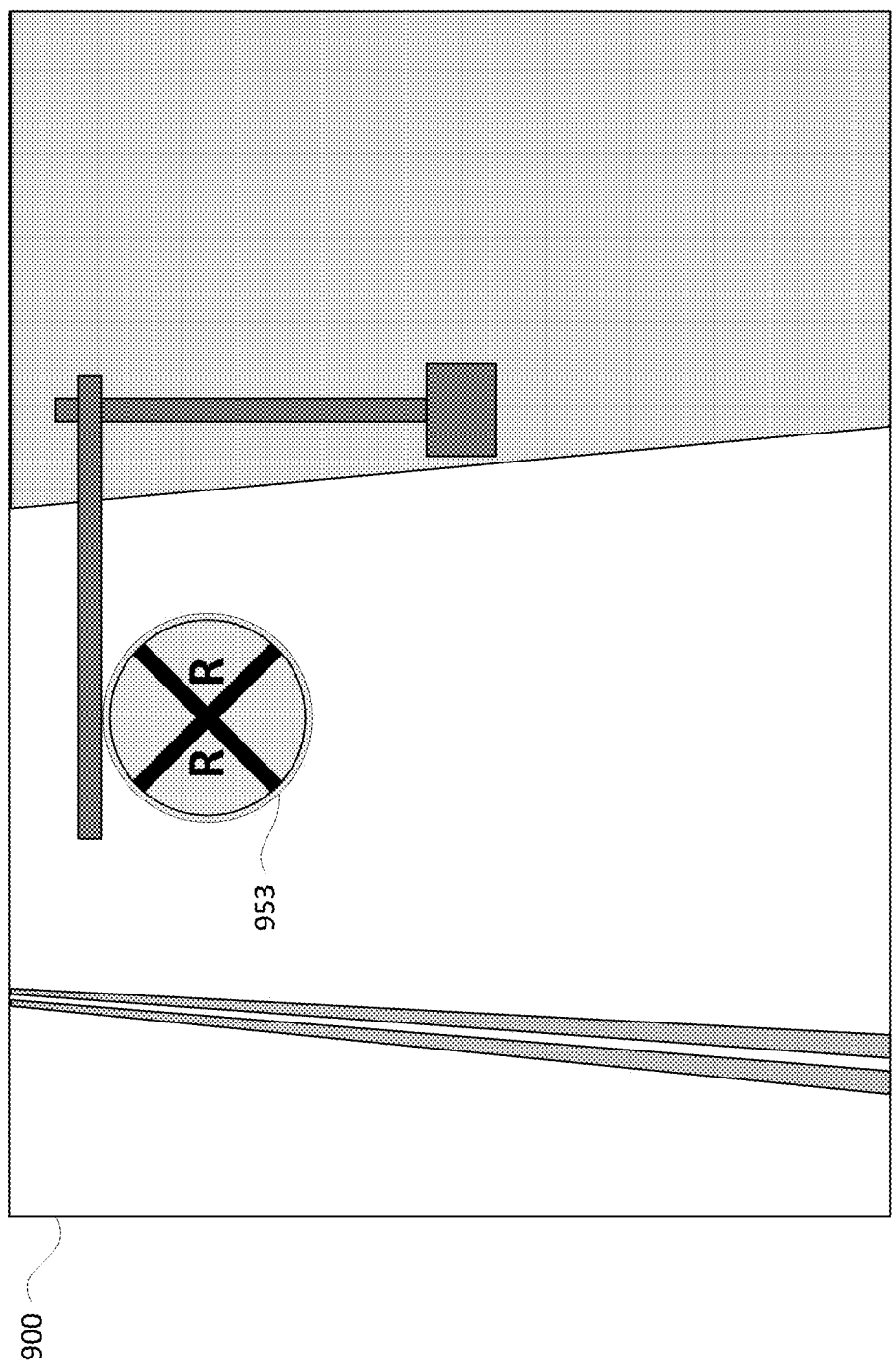
FIG. 9 is an example image in accordance with aspects of the disclosure.

Once the model 470 is trained, it may be sent or otherwise loaded into the memory of a computing system, such as memory 150 of vehicle 100 for use. For example, as a vehicle, such as vehicle 100 drives around, the vehicle's perception system 172 may capture sensor data of its surroundings. This sensor data, including any images of traffic signs, may be periodically, or continuously, input into the model 470 by the computing device 110. The model 470 may then provide a corresponding sign type for each traffic sign in the images. For example, a vehicle, such as vehicle 100 may capture an image, such as image 900 containing sign 953, as shown in FIG. 9. The model may output a label indicating the sign type is a "warning sign." In some instances, the model may also provide the specific type of sign. For example, the model may output "warning sign" and "railroad crossing ahead" sign types for sign 953. The provided sign type and attributes may then be used to determine how to control the vehicle in order to respond appropriately to the detected signs as described herein.

For each label indicating a specific sign type output by the model, the model may determine and assign a confidence level indicative of the probability that an output label is correct. In some instances, the model may be unable to determine a label indicating a traffic sign type for a traffic sign image input into the model. In this case, the model may categorize the traffic sign image as "unidentifiable" or "unknown". Labels indicating a specific sign type having a confidence level which fails to satisfy a particular threshold level may also be categorized as unidentifiable or unknown. In some circumstances, an autonomous vehicle, such as vehicle 100, may encounter a traffic sign which is not identifiable or not identifiable with a particular confidence (e.g., the model is unable to determine the traffic sign type to satisfy a particular confidence threshold), by the model 470 or within the map information. However, traffic signs are generally categorized by type according to regulations by government agencies such as the Federal Highway Administration, although the regulations may vary from region to region/country to country, etc. As such, most traffic signs can be categorized by whether certain attributes, such as color and shape, satisfy the regulations corresponding to certain sign types. The attributes assigned to each type of traffic sign may be color or shape based. For instance, red signs may be regulatory (e.g., stop and yield signs), yellow signs may be warning signs (e.g., railroad or yield up ahead signs), guide signs may be green (e.g., roadway exit signs), temporary traffic control signs may be orange (e.g., road work ahead signs,) recreation signs may be brown (e.g., picnic area signs), service signs may be blue (e.g., rest area signs), etc.

However, many traffic signs are unique or relatively obscure (collectively, "unfamiliar signs"), and, while these unfamiliar signs may follow regulations according to a sign type, their content may not be identified by the machine learning model, particularly when the machine learning model has not been provided with training data corresponding to the type and content of the unfamiliar sign. Moreover, some traffic signs may not follow regulations or otherwise fit into typical traffic sign categories. For instance, LED boards or handmade signs may not fit into typical traffic sign categories or follow regulations. For example, an LED board including a message stating "construction up ahead" or a handmade temporary sign instructing cars to turn may not fit the regulations of "temporary traffic control" signs and may not be identifiable or not identifiable with a high enough confidence, by a model, such as model 470.

To determine the type and content of an unfamiliar sign, the attributes of the unfamiliar sign may be compared to those of known signs. In this regard, attributes of known traffic signs may be labeled by human operators and/or by using image processing techniques as described herein. The labeled attributes may then be arranged in a data structure such as data structure 478, which may be a relational database or another associative structure that supports one to many mapping. For instance, attributes of known signs, such as their type, color, shape, reflection coefficient, placement, text, figures, accessories, etc., may be labeled and these labels may be stored into the data structure. For instance, the labels 863 of attributes of traffic sign 853 may be stored in the data structure in relation to the traffic sign 853, such as in storage 450. The computing device, such as computing device 110 in vehicle 100, may compare the attributes of the unfamiliar sign with those in the data structure to determine the type and content of the unfamiliar sign. Although the examples herein describe comparing the attributes of unfamiliar signs with those in the data structure to determine the type and content of the unfamiliar sign after implementing a machine learning model, such as model 470, the comparison of attributes may occur without, or before, implementing a machine learning model.

In one example, an autonomous vehicle's sensor, such as a sensor in the perception system 172, may capture image 600 containing an unfamiliar traffic sign 253 above road 216 as it travels, as shown in FIG. 6. The computing device 110 may attempt to determine the type and content of the unfamiliar traffic sign 253 by comparing the traffic sign's attributes to those in the data structure. For instance, the computing device 110 may determine the unfamiliar traffic sign has attributes of a rectangular shape, a brown color, and written text. These attributes may be compared against the attributes of signs in the data structure and, based on the comparison the unfamiliar traffic sign may be determined to be consistent with a recreation sign. In another example, a captured traffic sign may be determined to have attributes of an octagonal shape, red color, and text. The computing device 110 may compare these attributes against those of signs in the data structure and determine the captured traffic sign matches a regulatory sign with instructional content to "stop".

Figure 10:
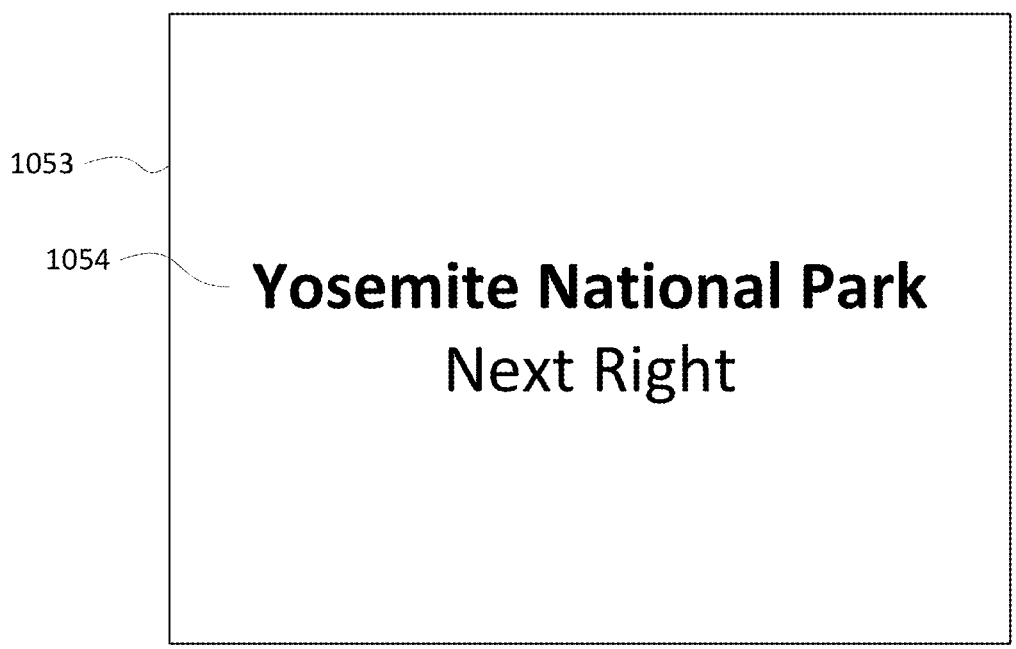
FIG. 10 is an example image in accordance with aspects of the disclosure.

Additional attributes of the sign may be used by the computing device 110 to determine the content of the sign. In this regard, the text or figures of a sign may be analyzed to determine the content of a signs. For instance, the unfamiliar sign 1053 of FIG. 10 may be determined to be a "recreation sign" having text 1054. The vehicle's computing device, such as computing device 110 may analyze the text 1054, such as by using optical character recognition (OCR), to determine the text 1054 states "Yosemite National Park Next Right." Based on this text, the computing device 110 may determine the content of the sign 1053 is informative and provides instructions to Yosemite National Park. In this regard, the vehicle's computing device may identify one or more keywords within the text, such as names of nearby landmarks/locations, directional terms, and/or numbers. Based on these keywords, the vehicle's computing device may determine the content of the sign. For instance, the computing device 110 may determine the keywords "Yosemite National Park" and "Next," and "Right" from text 1054 and based on these keywords determine the content of the sign 1053 is informative provides directions to Yosemite National Park. Similar determinations may be made based on figures. For instance, an arrow pointing to the right may result in the computing device determining the content of the sign is instructive of a detour to the right.

Based on the sign type and/or the content, the various systems of the autonomous vehicle may determine whether or not to take an action. In this regard, some signs may automatically trigger an action by the vehicle, such as regulatory, warning, guide signs, construction signs, etc. For instance, the vehicle's planning system 168 may instruct the vehicle 100 to stop, change course, or change speeds upon encountering a stop sign, detour sign, or speed limit sign, respectively. Other signs, such as recreation or rest area signs, may be ignored by the vehicle's planning system 168 unless the vehicle 100 is attempting to travel to those areas.

Figure 11:
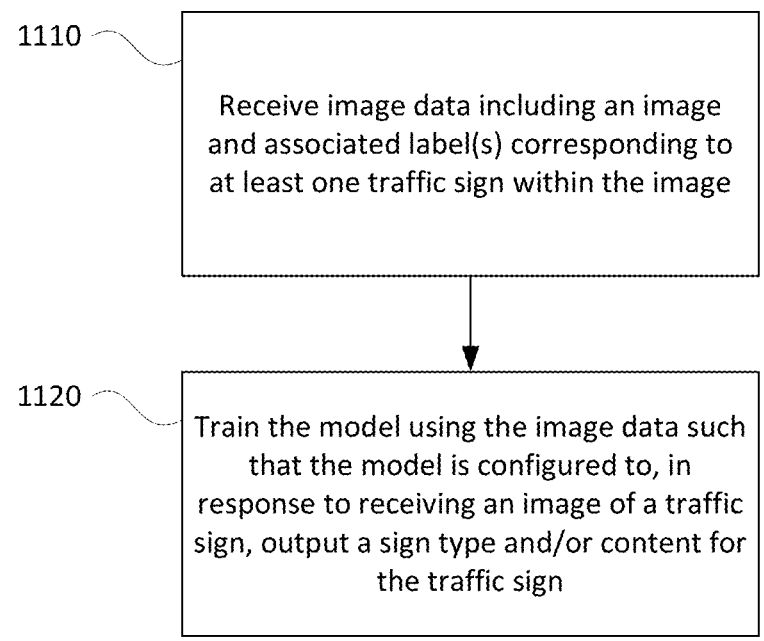
FIG. 11 is an example flow diagram in accordance with aspects of the disclosure.

FIG. 11 is an example flow diagram 1100 in accordance with aspects of the disclosure which may be performed by one or more processors of one or more computing devices, such as processors 120 of computing devices 110, in order to train a machine learning model to determine sign types. At block 1110 image data including an image and associated label(s) corresponding to at least one traffic sign within the image is received. The model may be trained using the image data such that the model is configured to, in response to receiving an image of a traffic sign, output a sign type and/or content for the traffic sign, as shown in block 1120.

Figure 12:
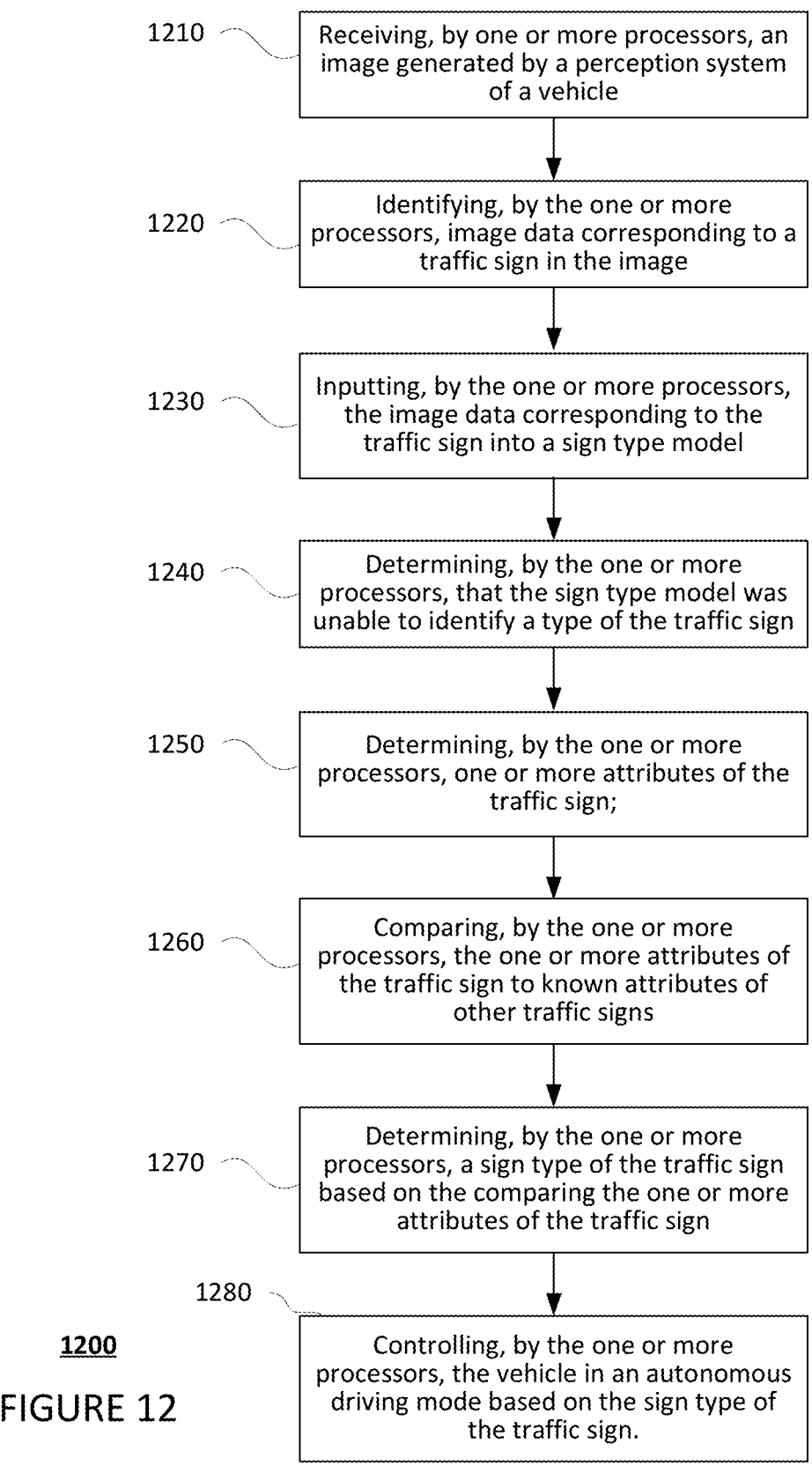
FIG. 12 is an example flow diagram in accordance with aspects of the disclosure.

FIG. 12 is an example flow diagram 1200 in accordance with aspects of the disclosure which may be performed by one or more processors of one or more computing devices, such as processors 120 of computing devices 110, in order to determine a sign type and control the vehicle based on the determined sign type. At block 1210, an image generated by a perception system of a vehicle may be received by one or more processors. One or more processors may identify image data corresponding to a traffic sign in the image at block 1220 and the image data corresponding to the traffic sign may be input into a model to generate a sign type of the traffic sign at block 1230. The one or more processors may determine that the sign type model was unable to identify a type of the traffic sign at block 1240 and determine one or more attributes of the traffic sign at block 1250. The one or more processors may compare the traffic sign to known attributes of other traffic signs, as shown at block 1260. Based on the comparing the one or more attributes of the traffic sign a sign type of the traffic sign may be determined, as shown in block 1270. The vehicle, in autonomous driving mode, may be controlled by the one or more processors based on the sign type of the traffic sign as shown in block 1280.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of categorizing attributes of traffic signs for controlling an autonomous vehicle, the method comprising:

receiving, by one or more processors, sensor data captured by a perception system of the autonomous vehicle, the perception system including a plurality of sensors, and the sensor data including a plurality of traffic signs in surroundings of the autonomous vehicle in images detected by the sensors over a period of time;

categorizing, by the one or more processors, one or more of the traffic signs as being unidentifiable or unknown when a sign type of the one or more of the traffic signs cannot be identified with a confidence level that meets a particular confidence threshold level;

comparing, by the one or more processors, attributes of each of the categorized one or more traffic signs to attributes of known traffic signs;

determining, by the one or more processors, a sign type of one or more of the categorized one or more traffic signs based on results of the comparing; and controlling, by the one or more processors, the autonomous vehicle based on the sign type of the one or more of the categorized one or more traffic signs.

2. The method of claim 1, wherein the one or more attributes indicate a shape of the traffic signs.

3. The method of claim 1, wherein the one or more attributes indicate a color of the traffic signs.

4. The method of claim 1, wherein the one or more attributes indicate text on the traffic signs.

5. The method of claim 1, further comprising:
determining, by the one or more processors, a sign type of one or more of the traffic signs; and
generating, by the one or more processors, one or more labels indicating the sign type.

6. The method of claim 5, wherein the confidence level is indicative of a probability that each of one or more labels indicating the attributes is correct.

7. The method of claim 6, further comprising:
storing, by the one or more processors, the one or more labels in a database.

8. The method of claim 7, further comprising:
comparing, by the one or more processors, attributes of an unfamiliar sign to the one or more labels in the database; and
determining, by the one or more processors, a type and content of the unfamiliar sign based on a result of the comparison.

9. The method of claim 1, wherein the controlling includes causing the autonomous vehicle to stop, change course or change speed upon encountering a traffic sign.

10. The method of claim 1, further comprising:
determining keywords from text or figures on one or more of the traffic signs, and determining content of the one or more of the traffic signs.

11. An apparatus for categorizing attributes of traffic signs for controlling an autonomous vehicle, the apparatus comprising:
a perception system including a plurality of sensors; and
one or more processors configured to:

receive sensor data captured by the perception system of the autonomous vehicle, the sensor data including a plurality of traffic signs in surroundings of the autonomous vehicle in images detected by the sensors over a period of time;

categorize one or more of the traffic signs as being unidentifiable or unknown when a sign type of the one or more of the traffic signs cannot be identified with a confidence level that meets a particular confidence threshold level;

compare one or more attributes of each of the categorized one or more traffic signs to one or more attributes of known traffic signs;

determine a sign type of one or more of the categorized one or more traffic signs based on results of the comparing; and control the autonomous vehicle based on the sign type of the one or more of the categorized one or more traffic signs.

12. The apparatus of claim 11, wherein the one or more attributes of each of the categorized one or more traffic signs indicate a shape of the traffic signs.

13. The apparatus of claim 11, wherein the one or more attributes of each of the categorized one or more traffic signs indicate a color of the traffic signs.

14. The apparatus of claim 11, wherein the one or more attributes of each of the categorized one or more traffic signs indicate text on the traffic signs.

15. The apparatus of claim 11, wherein the one or more processors are configured to:
generate one or more labels indicating the sign type of the one or more of the traffic signs.

16. The apparatus of claim 15, wherein the confidence level is indicative of a probability that each of one or more labels indicating the attributes is correct.

17. The apparatus of claim 16, further comprising a database, wherein the one or more processors are configured to store the one or more labels in the database.

18. The apparatus of claim 17, wherein the one or more processors are configured to:
compare attributes of an unfamiliar sign to the one or more labels in the database; and
determine a type and content of the unfamiliar sign based on a result of the comparison.

19. The apparatus of claim 11, wherein the one or more processors are configured to control the autonomous vehicle by causing the autonomous vehicle to stop, change course or change speed upon encountering the one or more of the categorized one or more traffic signs.

20. The apparatus of claim 11, wherein the one or more processors are further configured to determine keywords from text or figures on the one or more of the categorized one or more traffic signs, and determine content of the one or more of the categorized one or more traffic signs.

* * * * *